Patented June 15, 1937

2,083,893

UNITED STATES PATENT OFFICE 2,083,893

SOLVENT REFINING MINERAL OIL

Louis A. Clarke, Fishkill, N. Y., assignor to The Texas Company, New York, N. Y., a corporation of Delaware No Drawing. Application April 17, 1935, Serial No. 16,799

15 Claims. (Cl. 196—13)

This invention relates to refining hydrocarbon oil and more particularly to refining mineral oil such as mineral lubricating oil by solvent extraction.

The invention contemplates the treatment and refining of mineral oil with a selective solvent liquid to separate therefrom undesired constituents. It contemplates particularly the treatment of lubricating oil to produce therefrom lubricating oil products of desired characteristics.

The invention has particular reference to the extractive treatment of mineral oil with a solvent selected from the aromatic amino ethers such as anisidine and phenetidine. These two compounds, for example, have the formula, $R-OC_6H_4NH_2$, in which R represents the methyl and ethyl radicals, respectively.

I have discovered that these aromatic amino ethers anisidine and phenetidine, their isomers or mixtures comprising their various isomers, are suitable as extraction solvents for refining of mineral oil and particulary for the treatment of mineral lubricating oil to produce lubricating oil products of high viscosity index and having other desired characteristics.

Lubricating oil fractions derived from mixed base crude such as Mid-Continent crude contain relatively paraffinic constituents as well as relatively non-paraffinic constituents, including naphthenic, aromatic and unsaturated hydrocarbon bodies. I have found that the aromatic amino ethers above mentioned are particularly well adapted to the treatment of mineral lubricating oil fractions to effect separation between the paraffinic and relatively non-paraffinic constituents. Accordingly, the solvent liquids of my invention are adapted to remove the relatively non-paraffinic constituents from lubricating oil and produce therefrom lubricating oil products of highly paraffinic character having a relatively high viscosity index.

In the application of my invention to the treatment of mineral oil, the oil is mixed with the solvent liquid in the proportion of about one part of oil to about one to two parts of solvent liquid. This mixture, after thorough agitation at a suitable temperature as, for example, around 70 to 100° F., is allowed to separate into layers or phases. The extract phase will comprise the relatively non-paraffinic constituents of the oil dissolved in the solvent liquid while the raffinate phase will comprise the relatively paraffinic oil mixed with some of the solvent liquid.

These two phases are separated from each other and the solvent liquid recovered therefrom either by distillation or by washing with some other and more volatile solvent liquid.

The extent to which the oil is soluble in the solvent depends upon the nature of the oil as well as the temperature of extraction and the ratio of solvent liquid to oil employed during extraction. The extraction temperature and the ratio of solvent to oil may be varied for the purpose of effecting the particular degree of extraction desired. Consequently, in some instances, it may be desirable to employ temperatures either somewhat below or somewhat higher than those mentioned above and likewise the ratio of solvent to oil may be either greater or less than that specified.

The extraction may be carried out in a continuous countercurrent type of operation or in an intermittent batch type of operation. In the continuous countercurrent type of operation, the ratio of oil to solvent may be somewhat less than that used in the batch type of operation. Where the extraction is carried out in the countercurrent tower type of apparatus the ratio of solvent to oil is usually around one to two parts of solvent to one part of oil.

By way of specific examples, an untreated dewaxed distillate lubricating oil prepared from Mid-Continent crude and having the tests indicated below, was extracted with o-anisidine and also with both ortho and para phenetidine.

In each case one part by volume of the above oil was mixed with two parts of the solvent liquid in a batch type of extraction. The extraction was effected at a temperature of about 86° F. and while at this temperature the mixture of oil and solvent in each case was separated into extract and raffinate phases.

The phases were then separated and the solvent liquid removed therefrom. After removal of the solvent from the raffinate phase obtained in each case, the raffinate oil was found to have the following tests:

|  | Charge | o-anisidine extraction | o-phenetidine extraction | p-phenetidine extraction |
|---|---|---|---|---|
| Gravity A. P. I. | 21.3 | 25.3 | 26.4 | 24.8 |
| Say. Univ. vis. @ 100° F. | 1,236 | 839 | 731 | 886 |
| Say. Univ. vis. @ 210° F. | 80.5 | 72 | 70 | 73 |
| Car. res. % | .69 | .28 | .20 | .38 |
| Index vis. | 51 | 69 | 78.5 | 66.5 |
| Yield of raf. oil % | 100 | 83 | 67 | 84 |

As shown in the foregoing tabulation, the raffinate oil had a viscosity index of from 66.5 to 78.5 as compared to the viscosity index of 51 for the oil before treatment while the yield of raffinate oil ranged from 67 to 84 percent of the untreated oil. By varying the temperature of extraction and ratio of solvent to oil, lower yields of correspondingly higher viscosity index oil can be obtained.

In some instances it may be of advantage to carry out the extraction in the presence of a modifying solvent liquid such as benzol or a light petroleum fraction such as propane or butane for the purpose of facilitating the extraction and further controlling the extent thereof.

The lubricating oil distillate may be subjected to the foregoing extraction treatment either before or after dewaxing and also either before or after treatment with other solvents or chemicals.

The invention is not necessarily limited to the treatment of lubricating oil fractions since the solvents may be adapted to the refining and purification of hydrocarbon or mineral oil fractions, including naphtha, kerosene, etc., as well as residual or distillate fractions.

By reference to anisidine and phenetidine in the foregoing specification and in the appended claims, it is intended to include the isomers or mixtures of the isomers of these compounds since each species may consist of a mixture of its isomers.

Obviously many modifications and variations of the above invention, as hereinbefore set forth, may be made without departing from the spirit and scope thereof, and therefore only such limitations should be imposed as are indicated in the appended claims.

I claim:

1. In the refining of mineral lubricating oil containing relatively paraffinic and relatively non-paraffinic constituents, to separate therefrom a paraffinic fraction of relatively high viscosity index, the method which comprises mixing the oil with an aromatic amino ether having the character and solvent action of anisidine and phenetidine, forming an extract phase containing relatively non-paraffinic constituents of the oil dissolved in the solvent liquid and a raffinate phase comprising the relatively paraffinic constituents of the oil, separating the two phases and removing the solvent liquid therefrom.

2. In the refining of mineral lubricating oil containing relatively paraffinic and relatively non-paraffinic constituents, to separate therefrom a paraffinic fraction of relatively high viscosity index, the method which comprises mixing the oil with anisidine, forming an extract phase containing relatively non-paraffinic constituents of the oil dissolved in the solvent liquid and a raffinate phase comprising the relatively paraffinic constituents of the oil, separating the two phases and removing the solvent liquid therefrom.

3. In the refining of mineral lubricating oil containing relatively paraffinic and relatively non-paraffinic constituents, to separate therefrom a paraffinic fraction of relatively high viscosity index, the method which comprises mixing the oil with phenetidine, forming an extract phase containing relatively non-paraffinic constituents of the oil dissolved in the solvent liquid and a raffinate phase comprising the relatively paraffinic constituents of the oil, separating the two phases and removing the solvent liquid therefrom.

4. The method of refining hydrocarbon lubricant oil stock to remove naphthenic substances therefrom which comprises the steps of mixing the oil stock with phenetidine, using a proper temperature and a relative proportion of phenetidine sufficient to product two liquid phases; viz., a solvent phase consisting mainly of phenetidine and an oily phase consisting mainly of the oil and containing some phenetidine, removing the oily phase from the solvent phase, and removing the remainder of the phenetidine from the oily phase to obtain a refined lubricating oil.

5. The method of refining petroleum lubricant oil stock containing naphthenic substances which comprises extracting the said stock with liquid phenetidine under conditions promoting phase separation to separate naphthenic substances therefrom, separating phenetidine and extracted matter from the said stock, and freeing the remaining oil of such phenetidine as it may contain to produce a refined lubricating oil.

6. The method of refining petroleum lubricant oil stock containing naphthenic constituents which comprises intimately mixing the oil stock with an agent comprising phenetidine at proper temperatures and in sufficient proportion relative to the stock to produce two phases, namely, a solvent phase consisting mainly of solvent and extracted naphthenic substances and an oily phase consisting mainly of the oil and containing some phenetidine, separating the two phases, and removing solvent from the oily phase to obtain a refined lubricating oil.

7. In the refining of mineral lubricating oil, containing relatively high viscosity index and relatively low viscosity index constituents, to separate therefrom a fraction of relatively high viscosity index, the method which comprises mixing the oil with an aromatic amino ether having the formula, R—$OC_6H_4NH_2$, in which R represents an alkyl radical selected from the group consisting of methyl and ethyl, forming an extract phase containing relatively low viscosity index constituents of the oil dissolved in the solvent liquid, and a raffinate phase comprising the relatively high viscosity index constituents of the oil, separating the two phases, and removing the solvent liquid therefrom.

8. The method according to claim 1 in which the oil is separated into phases with the aromatic amino ether in the presence of a modifying solvent.

9. The method according to claim 7 in which the oil is separated into phases with the aromatic amino ether in the presence of a modifying solvent.

10. The method of refining hydrocarbon lubricant oil stock to remove naphthenic substances therefrom which comprises the steps of mixing the oil stock with anisidine, using a proper temperature and a relative proportion of anisidine sufficient to produce two liquid phases; viz., a solvent phase consisting mainly of anisidine and an oily phase consisting mainly of the oil and containing some anisidine, removing the oily phase from the solvent phase, and removing the remainder of the anisidine from the oily phase to obtain a refined lubricating oil.

11. The method of refining petroleum lubricant oil stock containing naphthenic substances which comprises extracting the said stock with liquid anisidine under conditions promoting phase separation to separate naphthenic substances therefrom, separating anisidine and extracted matter from the said stock, and freeing the remaining oil of such anisidine as it may contain to produce a refined lubricating oil.

12. The method of refining petroleum lubricant oil stock containing naphthenic constituents which comprises intimately mixing the oil stock with an agent comprising anisidine at proper temperatures and in sufficient proportion relative to the stock to produce two phases, namely, a solvent phase consisting mainly of solvent and extracted naphthenic substances and an oily phase consisting mainly of the oil and containing some anisidine, separating the two phases, and removing solvent from the oily phase to obtain a refined lubricating oil.

13. The method of refining petroleum lubricant oil stock containing naphethenic substances to produce therefrom a refined lubricating oil, which comprises extracting the petroleum stock with a solvent which is composed mainly of agents selected from the group consisting of ortho-phenetidine, meta-phenetidine and para-phenetidine, in relative proportion sufficient to produce two liquid phases, namely, a solvent phase consisting mainly of phenetidine and extracted naphthenic substances, an oily phase consisting mainly of the oil and containing phenetidine, removing the oily phase from the solvent phase, removing substantially all of the phenetidine from the oily phase to obtain a refined lubricating oil, and distilling off phenetidine from the solvent phase and recovering the same.

14. The method of refining petroleum lubricant oil stock containing naphthenic substances to produce therefrom a refined lubricating oil, which comprises extracting the petroleum stock with a solvent which is composed mainly of agents selected from the group consisting of ortho-anisidine, meta-anisidine and para-anisidine, in relative proportion sufficient to produce two liquid phases, namely, a solvent phase consisting mainly of anisidine and extracted naphthenic substances, an oily phase consisting mainly of the oil and containing anisidine, removing the oily phase from the solvent phase, removing substantially all of the anisidine from the oily phase to obtain a refined lubricating oil, and distilling off anisidine from the solvent phase and recovering the same.

15. The method of refining hydrocarbon oil containing relatively paraffinic and relatively non-paraffinic constituents, to separate the oil into fractions relatively rich in paraffinic and non-paraffinic constituents, respectively, which comprises mixing the oil with an aromatic amino ether having the formula, $R-OC_6H_4NH_2$, in which R represents an alkyl radical selected from the group consisting of methyl and ethyl, forming an extract phase containing relatively non-paraffinic constituents dissolved in the solvent liquid, and a raffinate phase comprising relatively paraffinic constituents of the oil, separating the two phases, and removing the solvent liquid therefrom.

LOUIS A. CLARKE.